J. F. MUMFORD.
MACHINE FOR MANUFACTURING BRUSHES.
APPLICATION FILED MAR. 1, 1904. RENEWED JULY 3, 1911.
1,016,951.
Patented Feb. 13, 1912.
7 SHEETS—SHEET 3.
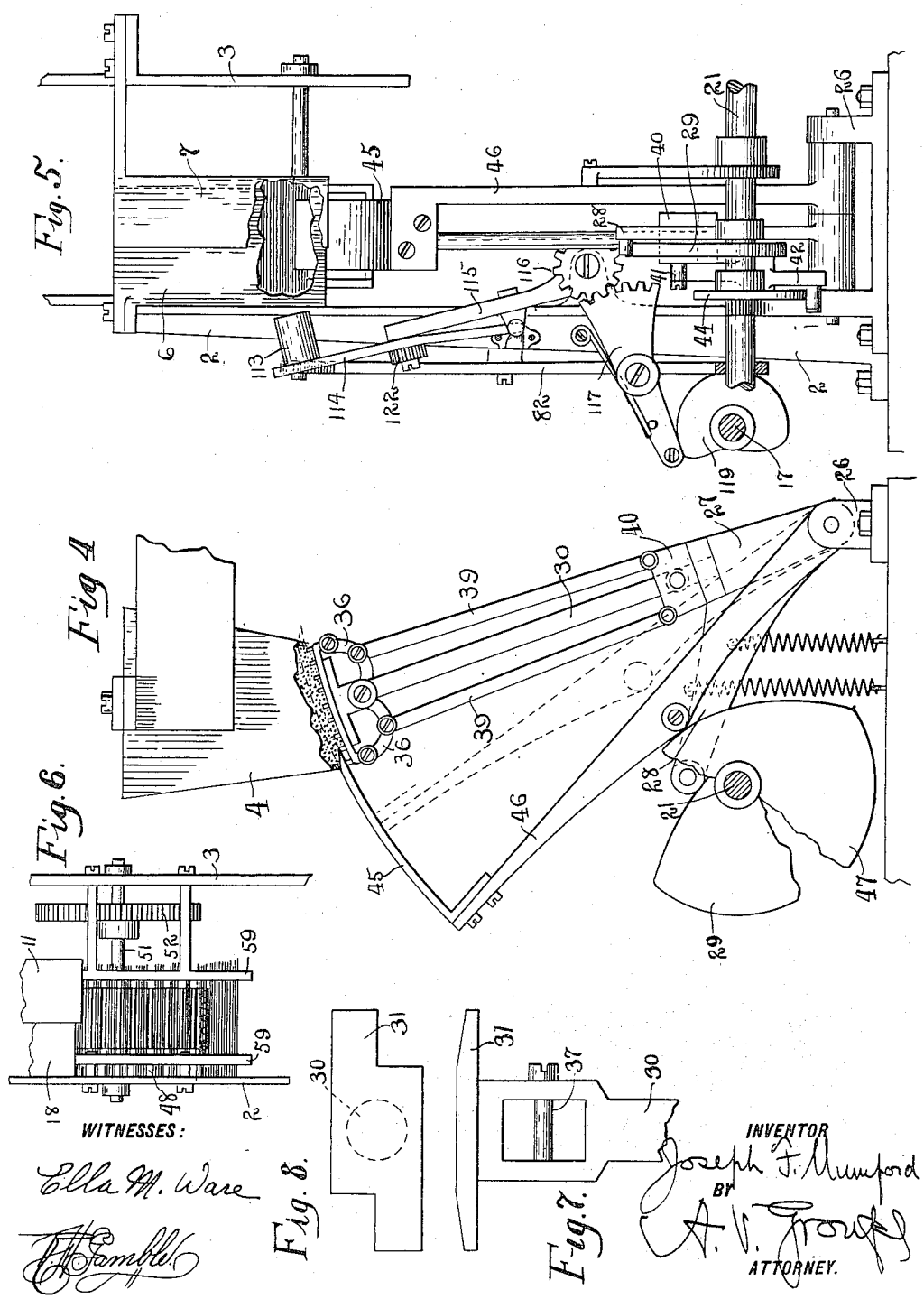

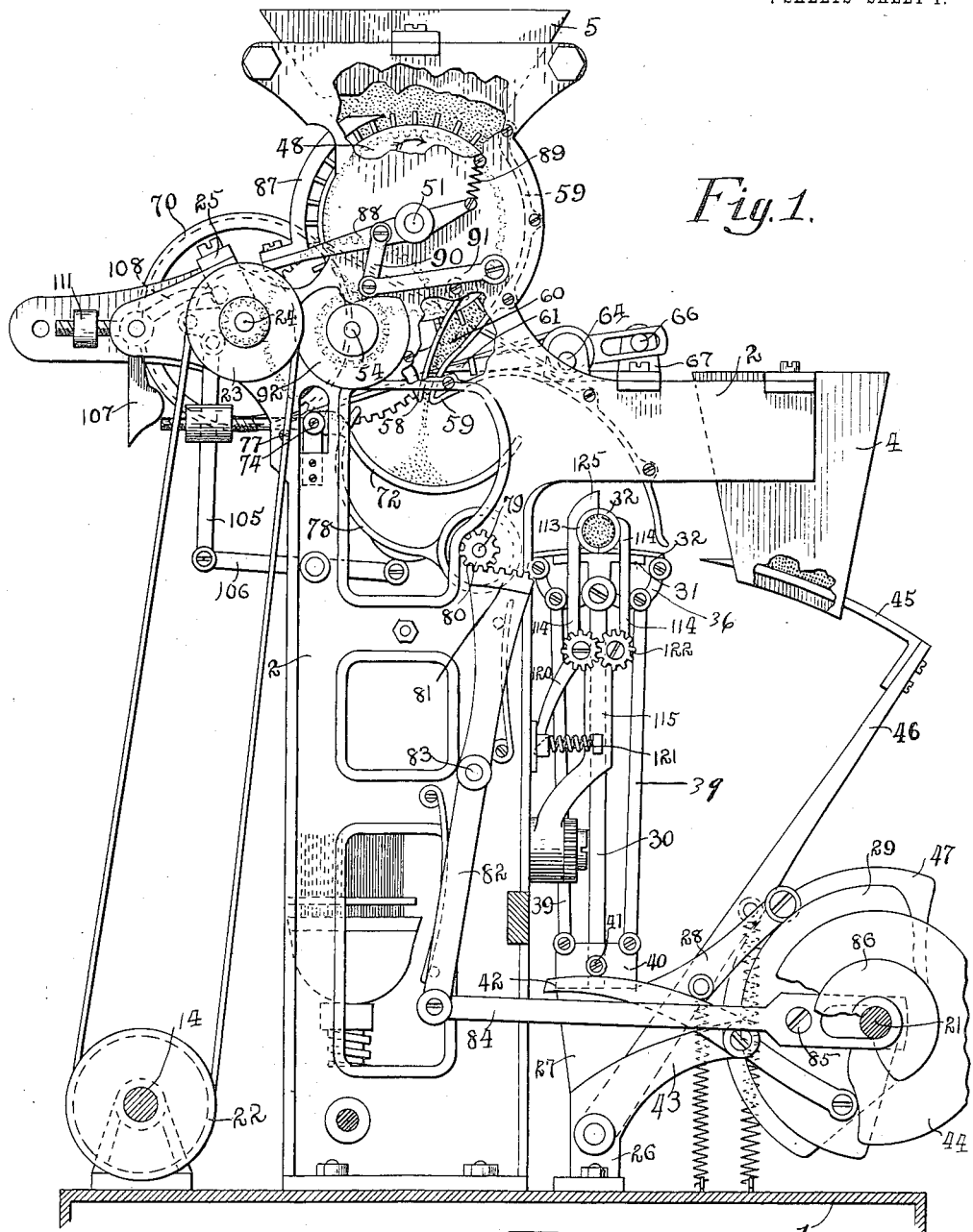

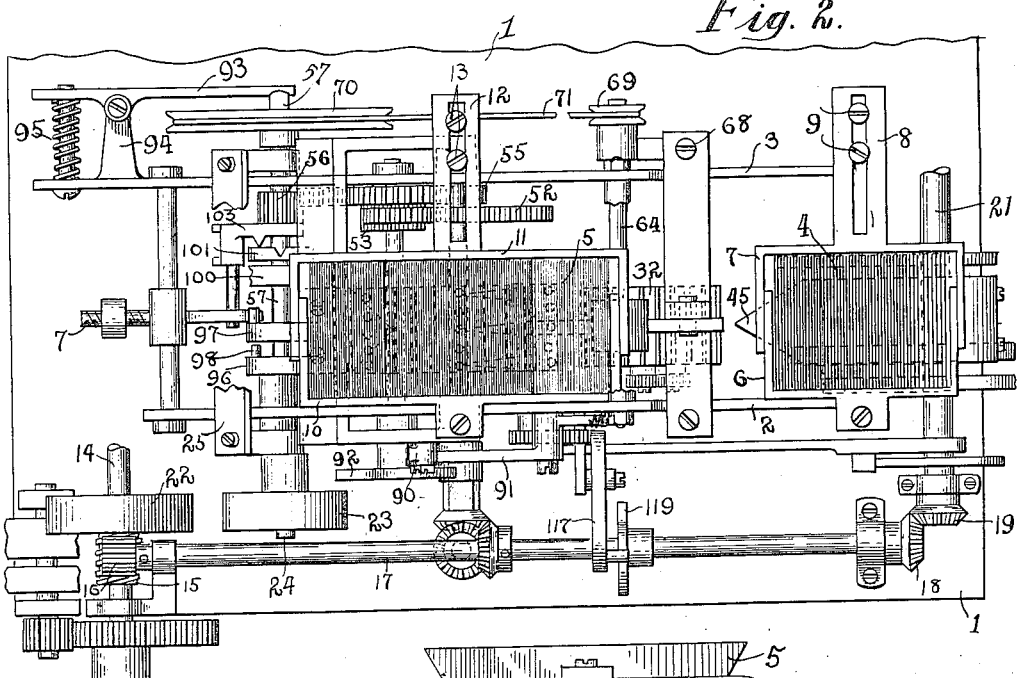
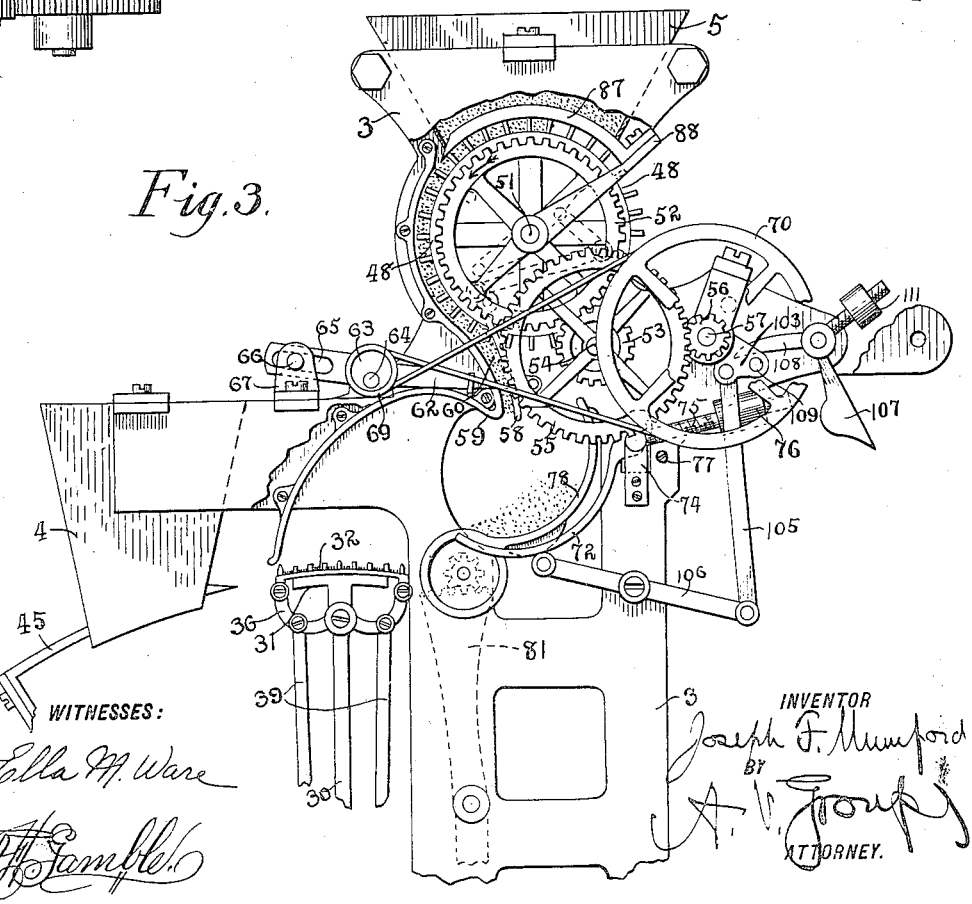

J. F. MUMFORD.
MACHINE FOR MANUFACTURING BRUSHES.
APPLICATION FILED MAR. 1, 1904. RENEWED JULY 3, 1911.
1,016,951.
Patented Feb. 13, 1912.
7 SHEETS—SHEET 4.
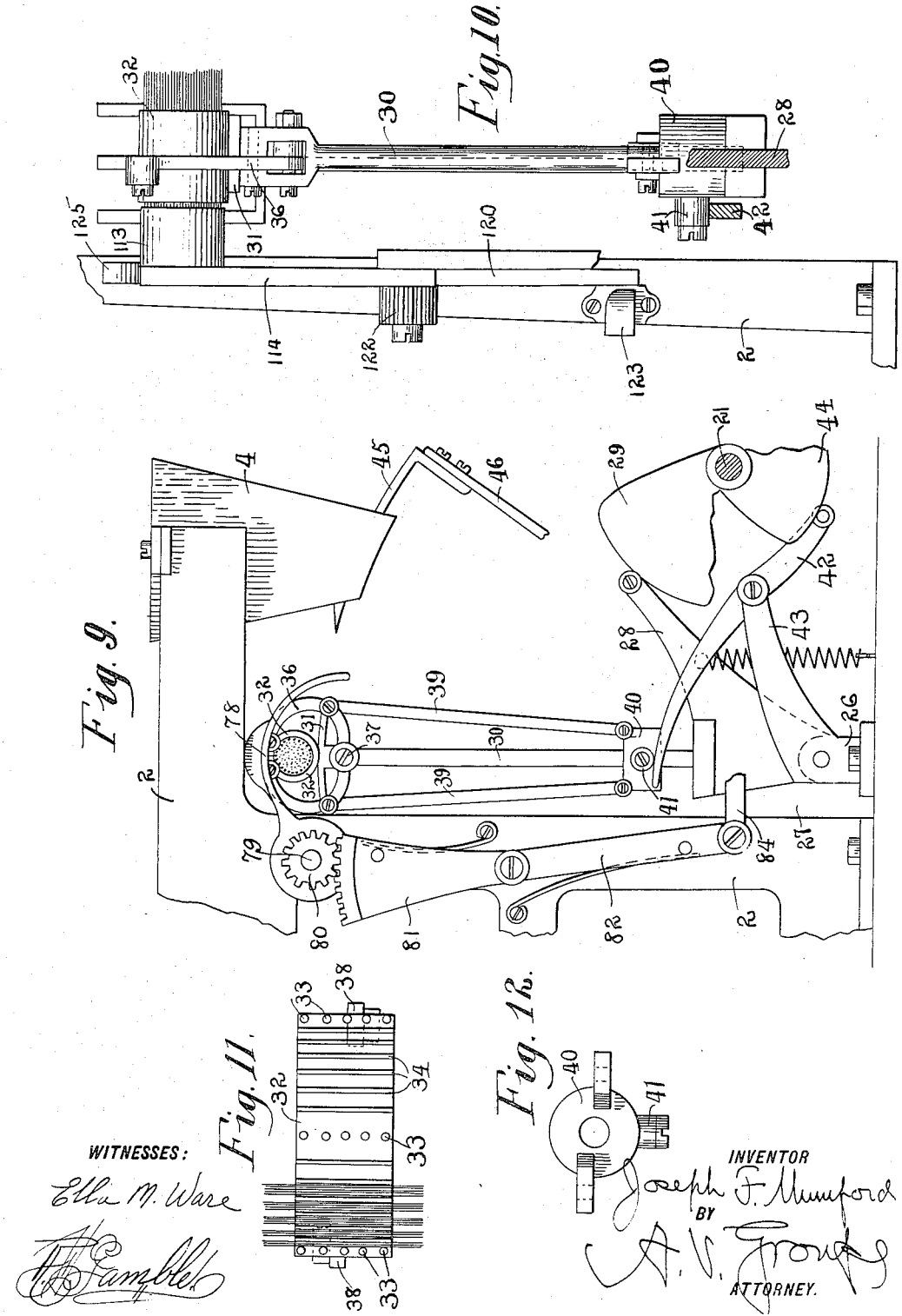

J. F. MUMFORD.
MACHINE FOR MANUFACTURING BRUSHES.
APPLICATION FILED MAR. 1, 1904. RENEWED JULY 3, 1911.
1,016,951.
Patented Feb. 13, 1912.
7 SHEETS—SHEET 5.
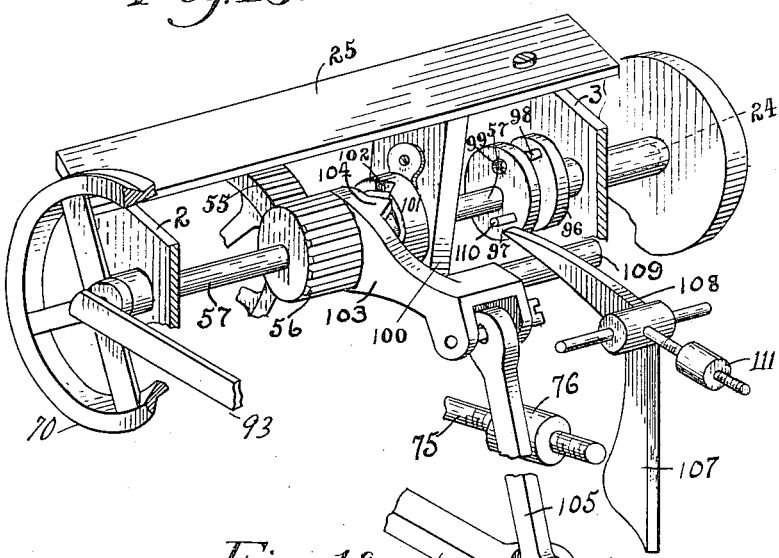
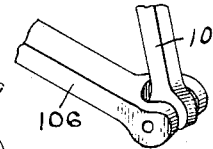
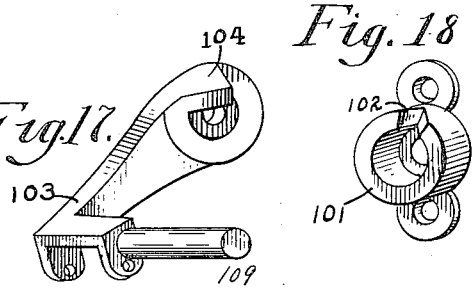
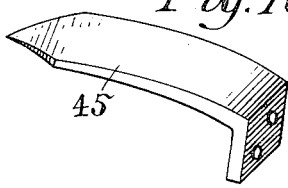
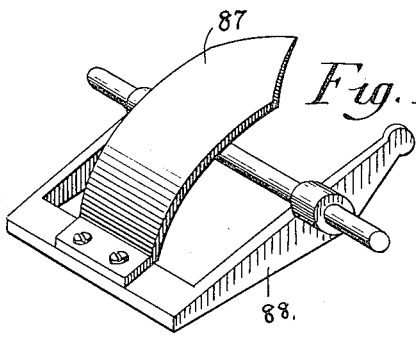
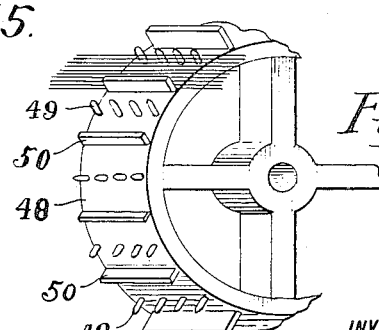
WITNESSES:
Ella M. Ware
H. Gamble
INVENTOR
Joseph F. Mumford
BY
A. V. Groupp
ATTORNEY.

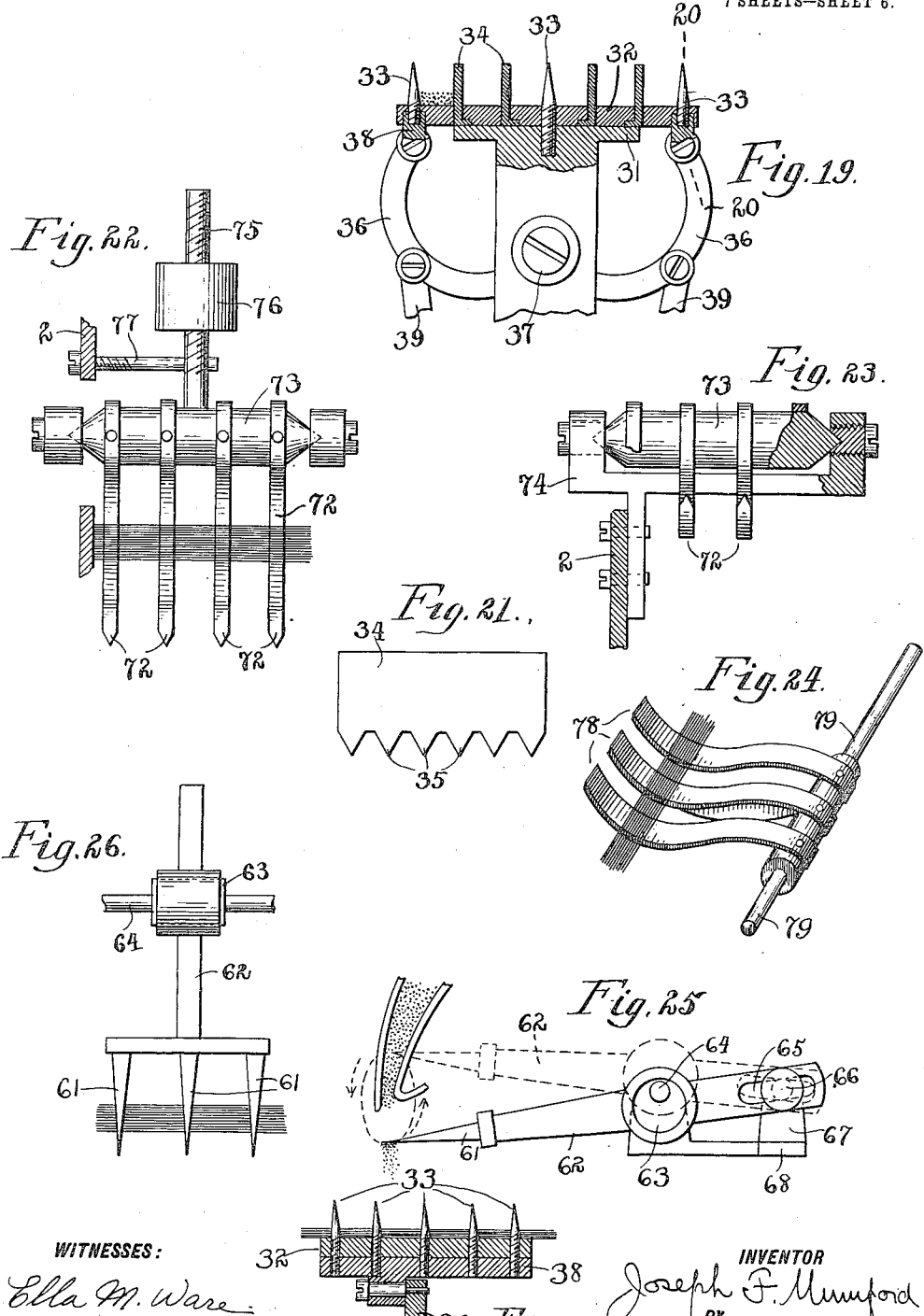

J. F. MUMFORD.
MACHINE FOR MANUFACTURING BRUSHES.
APPLICATION FILED MAR. 1, 1904. RENEWED JULY 3, 1911.
1,016,951.
Patented Feb. 13, 1912.
7 SHEETS—SHEET 7.
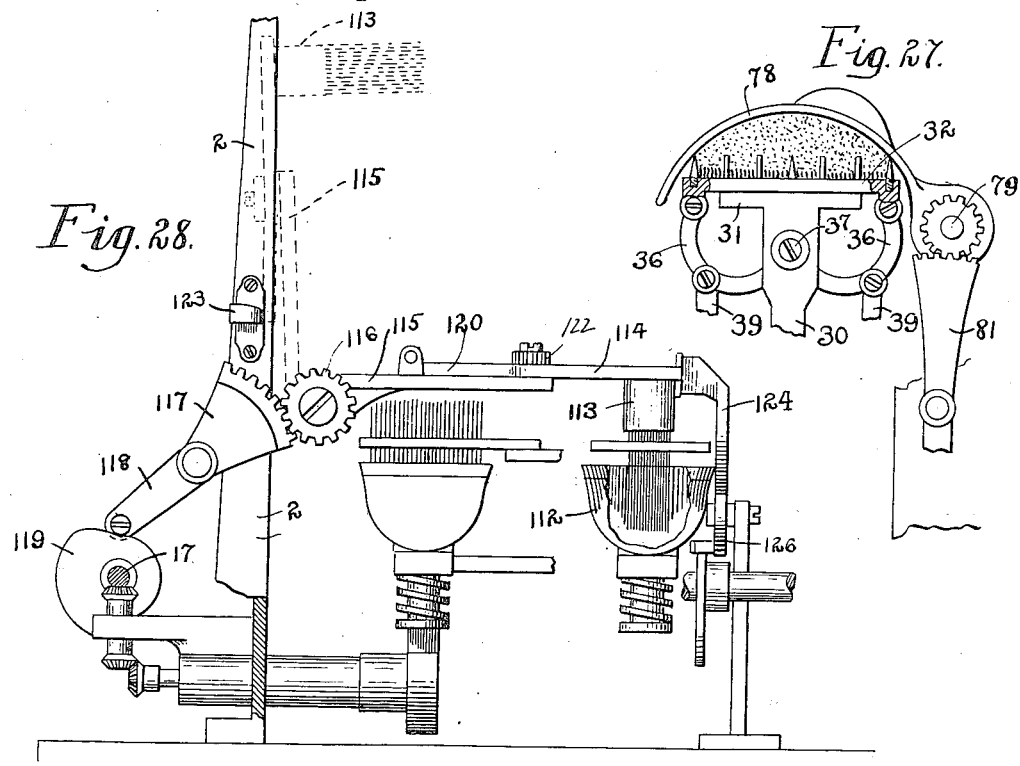
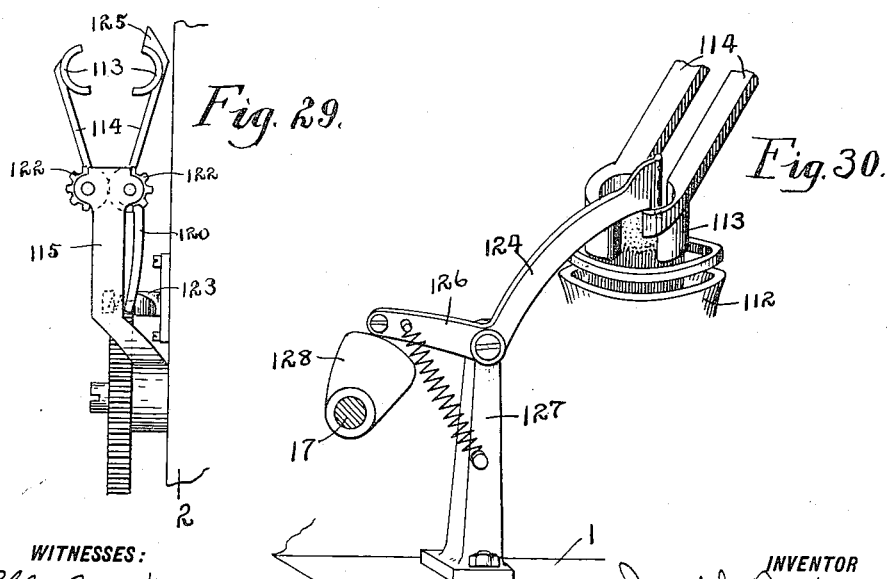
WITNESSES:
Ella M. Ware
[signature]
INVENTOR
Joseph F. Mumford
BY
[signature]
ATTORNEY.

UNITED STATES PATENT OFFICE.

JOSEPH F. MUMFORD, OF PHILADELPHIA, PENNSYLVANIA, ASSIGNOR TO AUTOMATIC BRUSH MACHINERY COMPANY, OF WILMINGTON, DELAWARE, A CORPORATION OF DELAWARE.

MACHINE FOR MANUFACTURING BRUSHES.

1,016,951. Specification of Letters Patent. Patented Feb. 13, 1912.

Application filed March 1, 1904, Serial No. 196,063. Renewed July 3, 1911. Serial No. 636,745.

*To all whom it may concern:*

Be it known that I, JOSEPH F. MUMFORD, a citizen of the United States, residing in the city and county of Philadelphia, State of Pennsylvania, have invented certain new and useful Improvements in Machines for Manufacturing Brushes, of which the following is a full, clear, and exact specification.

My invention relates to the manufacture of that class of brushes wherein bristles of a certain quality are assembled around bristles of another quality, thereby forming a brush knot the interior or central portion of which is formed of bristles of a certain quality surrounded or incased by bristles of another quality.

The object of my invention is to provide a simple and efficient machine for the manufacture of brushes, said machine having provision whereby a brush knot of the character above mentioned may be formed.

To this end the invention consists in providing two hoppers or sources of supply for the bristles of different quality, in combination with mechanism for taking a predetermined quantity of bristles from one hopper or source of supply, and assembling said bristles around a predetermined quantity of bristles taken from the other hopper or source of supply, as will be hereinafter fully described and particularly claimed.

In the drawings:—Figure 1 is an elevation, partially broken away, of a brush making machine embodying my invention. Fig. 1ª is a detail, in perspective, of a portion of one of the hoppers for containing the bristles. Fig. 2 is a plan view of the machine. Fig. 3 is an elevation of the upper portion of the machine, partially broken away, as seen from a position opposite to Fig. 1. Fig. 4 is an elevation, partly broken away, of one of the hoppers for containing bristles, and the mechanism directly concerned in taking bristles therefrom. Fig. 5 is an elevation of the parts shown in Fig. 4, as seen at right angles thereto, and including certain additional parts not shown in Fig. 4. Fig. 6 is a fragmentary view in elevation of the bottom of one of the bristle hoppers, the bristle-transferring wheel extending thereinto, and adjuncts. Figs. 7 and 8 are details of certain parts of the bristle assembling mechanism shown in Figs. 4 and 5. Fig. 9 is an elevation of the parts shown in Fig. 4, and certain additional parts, all as seen from a position opposite to Fig. 4. Fig. 10 is an elevation, enlarged, of some of the parts shown in Fig. 9, at right angles thereto, and including certain additional parts of the bristle assembling mechanism. Fig. 11 is a plan view of the flexible apron upon which bristles are received from one of the hoppers. Fig. 12 is a detail, in plan, of one of the parts shown in Figs. 9 and 10. Fig. 13 is a perspective view of a portion of the automatic mechanism for controlling the discharge of bristles from one of the hoppers. Fig. 14 is a perspective view of a portion of the bristle-feeding wheel. Fig. 15 is a perspective view of the bristle-dividing knife and adjuncts for one of the hoppers. Fig. 16 is a perspective view of the bristle-dividing knife for the other hopper. Figs. 17 and 18 are details in perspective of two clutch members shown in Fig. 13. Fig. 19 is a sectional elevation of a portion of the mechanism for assembling the bristles. Fig. 20 is a sectional detail as on the line 20—20 of Fig. 19. Fig. 21 is a detail of one of the blades of the flexible apron shown in Fig. 19. Fig. 22 is a detail in plan of a portion of the mechanism for transferring bristles from one of the hoppers. Fig. 23 is a detail in sectional elevation of the mechanism shown in Fig. 22. Fig. 24 is a perspective view of a portion of the bristle-transferring mechanism working in conjunction with the parts shown in Figs. 22 and 23. Fig. 25 is an elevation of the picking device and adjuncts for discharging bristles from one of the hoppers. Fig. 26 is a plan view of the picking device. Fig. 27 is a detail of a portion of the bristle assembling mechanism. Fig. 28 is an elevation of the mechanism for transferring the bristles from the assembling mechanism to the cup for shaping the brush knot. Fig. 29 is an elevation of the clamp for transferring the bristles as seen in the raised position, and at right angles to the parts shown in Fig. 28. Fig. 30 is a perspective view of a portion of the transferring clamp, one of the brush-shaping cups, the opening lever for the clamp, and the cam for actuating the lever.

As generally stated, the main frame of the machine comprises the bed plate 1 and the side frames 2 and 3. Mounted on the side frames 2 and 3 are two bristle hoppers 4 and 5. The hopper 4 is made in two parts 6 and 7, one telescoping upon the other, so that the hopper may be adjusted to accommodate bristles of different lengths; the part 6 being fixed to the side frame 2 and the part 7 being provided with a slotted projection 8 and adjustably held upon the frame 3 by suitable screws 9. The hopper 5 is also made in two parts 10 and 11, one telescoping upon the other, so that the hopper may be adjusted to accommodate bristles of different lengths; the part 10 being fixed to the side frame 2, and the part 11 being provided with a slotted projection 12, and adjustably held upon the frame 3 by suitable screws 13. The hopper 5 is adapted to contain the bristles which go to form the central or body portion of the brush knot, and the hopper 4 is adapted to contain the bristles which are assembled around in a manner to incase the bristles forming the central or body portion of the knot.

Mounted in suitable bearings on the bed plate 1, is the main driving shaft 14. This shaft 14 is provided with a worm 15 which co-acts with a worm wheel 16 on one end of a horizontal shaft 17, which is also mounted in bearings upon the bed plate 1. The other end of the shaft 17 is provided with a beveled gear wheel 18, in mesh with a similar wheel 19 on the end of a cam shaft 21, mounted in bearings on the bed plate 1. The main shaft 14 is provided with a pulley 22 which is belted with a pulley 23 on a clutch shaft 24 having its bearings in the side frame 2, and a bracket 25 extending between the side frames 2 and 3.

Movable to a position beneath and away from the hopper 4 is the upper end of a bristle assembling mechanism of the following construction:—Secured to the bed plate 1 is a bracket 26 upon which is pivotally mounted a rocking arm 27 provided with a projection 28 carrying a cam roller which bears against a cam 29 on the shaft 21; whereby, during the rotation of said shaft, the arm 27 may be rocked. Rising fixedly from the arm 27 is a shaft 30, upon the upper end of which is formed a table 31. Resting upon the table 31 is a flexible apron 32, provided with upwardly projecting pins 33 and blades 34, the blades 34 extending transversely of the apron.

In Fig. 21 I have shown a detail of one of the blades 34 before the same has been applied to the apron 32. This blade 34 is provided on its lower edge with teeth, 35, adapted to be projected through the apron 32 and bent at right angles to the blade 34.

The central portion of the apron 32 is secured to the table 31 by the lower screw-threaded ends of the row of pins 33, and the outer ends of the apron 32 are secured to bars 38 extending transversely beneath the apron. The ends of the apron 32 extend beyond the table, and the bars 38 thereof are pivotally connected to the upper ends of arms 36, the lower ends of which are pivoted as at 37, to the central shaft 30, whereby, when the arms 36 are moved upwardly upon the pivot 37, the free ends of the apron 32 will be moved upwardly and toward each other, in a manner to cause said apron to assume a circular form.

The arms 36 are pivotally connected to the upper ends of rods 39, the lower ends of which are pivoted to a block 40 which is slidingly fitted to the central shaft 30 and rests normally upon the arm 27, by gravity. The block 40 is provided with a roller 41 against which bears one end of a lever 42 which is pivoted to an arm 43 extending from the bracket 26. The other end of the lever 42 is provided with a roller in engagement with a cam 44 on the shaft 21, whereby during the rotation of the shaft 21 the lever 42 will be rocked to raise and lower the block 40 upon the shaft 30, and thereby raise and lower the arms 36 in a manner to cause the apron 32 to assume the circular form hereinbefore mentioned.

The cam 29, acting against the roller on the projection 28 of the arm 27, moves the table 31 and the superposed apron 32 to a position beneath the hopper and away from said position. The length of the apron 32 is equal to the length of an opening in the bottom of the hopper 4, so that when the apron is beneath the hopper, it forms in effect the bottom thereof.

Arranged to move directly over the pins 33 and blades 34 of the apron 32, when the same is beneath the hopper 4, is a bristle-separating knife, 45. This knife 45 is adapted to move to the position shown in Fig. 4 when the apron 32 is beneath the hopper 4, and thus permit the bristles contained within the hopper to settle down and fill the spaces between the pins 33 and blades 34, and to then be projected over the pins 33 and blades 34 to raise or separate the bristles above the tops of said pins and blades from the bristles between said pins and blades; after which, the apron 32, supplied with a layer of bristles from the hopper 4, may be moved to a position away from the bottom thereof.

The knife 45 is carried by the upper end of an arm 46, the lower end of which is pivoted to the bracket 26. This arm 46 is provided with a roller which bears against a cam 47 on the shaft 21, whereby, during the rotation of the shaft 21, the arm 46 will be rocked to cause the knife 45 to be withdrawn from and projected across the opening in the bottom of the hopper 4.

The bottom of the hopper 5 is provided with an opening therein under which extends the upper portion of a wheel 48, which is provided with radially projecting pins 49 and blades 50. The wheel 48 is mounted on a shaft 51 which is provided with a gear wheel 52 in mesh with a pinion 53 on a shaft 54; and the shaft 54 is provided with a gear wheel 55 in mesh with a pinion 56 on a clutch shaft 57, whereby, when the shaft 57 is rotated, the wheel 48, through the intermediate gearing, will be slowly rotated in the direction indicated by the arrows in Figs. 1 and 3.

87 designates a curved knife adapted to move through the bottom of the hopper 5, directly over the pins 49 and blades 50 of the wheel 48, to separate the main body of the bristles contained within the hopper from those that have settled between the pins and blades. The wheel 48 is operated, at certain intervals, as will hereinafter appear, and before each movement of the wheel 48 the knife is projected over its pins and blades and through the hopper, to separate the bristles, and said knife is withdrawn from the hopper and again projected over the wheel 48, before the next succeeding forward movement of the wheel. To thus operate the knife 87, I mount the same upon one end of a lever 88, the other end of which is connected to a spring 89 which is attached to the side frame 2 to maintain the knife normally withdrawn from the hopper 5. The lever 88 is connected to a link 90 which is connected to one end of an arm 91 pivoted to the side frame 2. The connection of the link 90 with the arm 91 is provided with a roller bearing against a cam 92 on the shaft 54, hereinbefore mentioned; the contour of the cam 92 being such as to cause the proper operation of the knife 87.

The width of the wheel 48 is less than the width of the interior of the hopper 5, and arranged on each side of the wheel 48 are guiding strips 58 and 59 for the bristles from the hopper 5. These guiding strips are supported by the side frames 2 and 3, and they form a pocket 60 for the reception of bristles from the hopper 5, which are transferred thereto by and between the pins 49 and blades 50 of the wheel 48. The strips 59 extend around the downwardly moving face of the wheel 48, and the hopper 5, to prevent the discharge of bristles from between the pins 49 and blades 50 until the bristles reach the pocket 60; whereupon the strips 58 serve to move the bristles over between said pins and blades and into the pocket.

Extending into the lower portion of the pocket 60 are the pointed tines 61 forming the forward end of a picking fork 62. The body of this fork 62 is provided with a circular opening therein to which is fitted an eccentric 63, and the rearward extension is provided with a slot 65 into which extends a pin 66 projecting from a bracket 67 on a bar 68 extending between the side frames 2 and 3. Thus it will be seen that during the rotation of the shaft 64, the eccentric 63 and the pin-and-slot connection of the fork will cause the pointed ends of the tines 61 to traverse an elliptical path intersecting the lower portion of the pocket 60, as shown by dotted lines in Fig. 25. The shaft 64 is rotated to operate the fork 62 when the clutch shaft 57 is in operation; the shafts 64 and 67 being provided with pulleys 69 and 70 respectively, which are connected by a cross belt 71.

During the operation of the fork 62 the pointed ends of the tines 61 passing through the lower portion of the pocket 60 engage the bristles contained therein, and discharge them from the opening in the bottom of said pocket; and as the bristles are discharged from the lower portion of the pocket, the same is refilled or supplied with other bristles from the rotating wheel 48. As the bristles fall from the opening in the bottom of the pocket 60, they are received upon curved arms 72 projecting from a rock shaft 73 the ends of which are pointed and enter bearings in a bracket 74, which is secured to the side frame 2. Projecting from the shaft 73 in a direction opposite to the arms 72 is a screw-threaded rod 75 upon which is screwed a weight 76 to overbalance the arms 72, the rod 75 resting normally upon a pin 77 projecting from the side frame 2.

During the operation of the machine, the bristles are picked from the pocket 60 and deposited upon the arms 72 until the weight of the deposited bristles is sufficient to raise the rod 75 and weight 76 from the pin 77; whereupon the arms 72 move downwardly and the bristles resting thereon are deposited upon the underlying curved arms 78; the spaces between the arms 72 being arranged and located to permit the passage therethrough of the curved arms 78.

The arms 78 project from a rock shaft 79 mounted in and extending between the side frames 2 and 3. One end of the shaft 79 is provided with a gear wheel 80 which is engaged by a toothed sector 81 forming the upper end of a lever 82 which is pivoted as at 83 to the side frame 2. The lower end of the lever 82 is pivoted to one end of a rod 84, the other end of which is slotted and embraces the shaft 21. This rod 84 is provided with a cam roller 85 adapted to be engaged by a cam 86 on the shaft 21, whereby, during the rotation of the shaft 21, the rod 84 will be moved forward and back in a manner to rock the lever 82 and thereby cause the sector 81 to operate the gear wheel 80 to rock the shaft 79 and therewith the arms 78 from the position shown in Fig. 27, and back again. The roller 85 is pressed into engagement with the cam 86 by a suitable spring acting upon the lever 82.

When the apron 32 occupies its position away from the bottom of the hopper 4, it is in a position to receive the bristles from the arms 78 when they are rocked to the position shown in Fig. 27. As previously stated, the wheel 48 is actuated at certain intervals and during the actuation of the wheel 48 the picker 61 and the knife 87 are actuated and these parts are all connected to the clutch shaft 57, which is operated by the clutch shaft 24, by mechanism hereinafter described. When the arms 72 and 78 for receiving bristles from the pocket 60 are in the position shown in Fig. 1, the shaft 57 is being rotated by the shaft 24, thus causing the wheel 48 to feed bristles from the hopper 5 to the pocket 60, and the picker 61 to pick and discharge bristles from the lower open end of the pocket 60. The bristles thus discharged are received upon the arms 72 and when a sufficient quantity of bristles has been deposited upon the arms 72 to lower the same, the rod 75 is raised and this raising of the rod 75 causes the shaft 24 to cease to rotate the shaft 57, and thereby stop the discharge of bristles from the pocket 60, and the feeding of bristles from the hopper 5. The lowering of the arms 72 deposits the bristles upon the arms 78 and the bristles are then deposited upon the apron 32 by the movement of the arms 78. The shaft 57 remains idle during both the forward and backward movement of the arms 78, and as the arms 78 reach the limit of their backward movement, the shaft 57 is again actuated from the shaft 24 to resume the feeding of bristles from the hopper 5 to the arms 72, which had previously resumed their normal position by the gravity of the weight 76 after the bristles had been deposited upon the arms 78.

To thus actuate the shaft 57 from the shaft 24, I provide the following mechanism:—The shaft 57 is mounted to slide axially within its bearings toward and from the shaft 24, and one end of the shaft 57 extends outwardly and is engaged by one end of a lever 93 mounted on a bracket 94 projecting from the side frame 3. The other end of the lever 93 is engaged by a spring 95, which presses against the lever in a manner to cause the shaft 57 to be pressed normally toward the shaft 24. The adjacent ends of the shafts 24 and 57 are provided with heads 96 and 97 respectively. The head 96 is provided with a pin 98 projecting toward the head 97, and the head 97 is provided with an opening 99 for the reception of the pin 98. When the pin 98 is within the opening 99 the shaft 24 will be rotated by the shaft 57, and when the head 97 is withdrawn from the pin 98 the shaft 57 will cease to rotate. Depending from the bar 25 is a bracket 100, through which the shaft 57 extends. Secured to the bracket 100 and surrounding the shaft 57 is a collar 101 provided with a V-shaped opening 102. Surrounding the shaft 57 adjacent the collar 101 is one end of an arm 103 which is movable axially upon the shaft 57. This arm 103 is provided with a V-shaped projection 104 adapted to register with the V-shaped opening 102. Thus it will be seen that when the parts occupy the position shown in Fig. 13, the projection 100 bearing against the face of the collar 101 will retain the shaft 57 withdrawn from the shaft 24 against the action of the spring 95, in which position the pin 98 is out of engagement with the opening 99. When the arm 103 is rocked to bring the projection 104 into register with the opening 102, the shaft 57 is moved by the action of the spring 95 toward the shaft 24, thus permitting the pin 98 to enter the opening 99 and rotate the shaft 57 until the arm 103 is again rocked to disengage the projection 104 from the opening 102. This disengagement of the projection 100 from the opening 102 moves the shaft 57 outwardly against the action of the spring 95, and again disengages the opening 99 from the pin 98, and brings the shaft 57 to rest for a succeeding operation.

The arm 103 is connected to a link 105 which is connected to one end of a lever 106, which is pivotally mounted on the side frame 2. The other end of the lever 106 is adapted to be engaged by a projection on one of the arms 78 when said arms reach the limit of their forward movement, and thus rock the arm 103 in a manner to cause the shaft 57 to be again rotated by being coupled with the shaft 24.

When the arms 72 are lowered by the weight of the bristles thereon and the rod 75 raised thereby, the free end of the rod engages a cam arm 107 forming one arm of a lever 108 which is pivoted to the side frames 2 and 3. The lever 108 extends over a pin 109 projecting from the arm 103, and the lever 108 extends to a point near the path of travel of a pin 110 on the head 97. A balance weight 111 causes the depending cam arm 107 to maintain the lever 108 normally raised out of the path of travel of the pin 110.

When the rod 75 engages the arm 107 during the downward movement of the arms 72, the arm 107 is moved outwardly, which causes the projecting end of the lever 108 to move downwardly into the path of the pin 110, which engages the lever 108 and moves the same downwardly. The downward movement of the lever 108 engages the pin 109, and depresses the arm 103, thereby moving the projection 104 out of engagement with the depression 102, and releasing the pin 98 from the pin 99, to stop the rotation of the shaft 57.

After the bristles have been assembled into the brush knot upon the apron 32, the assembled brush knot is transferred to a brush-shaping cup 112, similar to that shown in my Letters Patent No. 764,898, dated July 12th, 1904, wherein the brush knot is shaped preparatory to being assembled with other parts to form a complete brush. To thus transfer the brush knot I provide the following mechanism:—113 designates a pair of clamping members mounted on arms 114 and adapted to move toward and from each other to embrace and clamp the brush knot upon the apron 32. The lower ends of the arms 114 are provided with coacting gears, 122, and are pivoted to the upper end of an arm 115 which is pivotally mounted on a projection of the side frame 2. The pivoted end of the arm 115 is provided with a gear wheel 116 in mesh with a toothed sector 117 pivoted to a projection on the side frame 2. Projecting from the sector 117 is an arm 118 provided with a roller in engagement with a cam 119 on the shaft 17 hereinbefore mentioned, whereby, during the rotation of the shaft 17 the cam 119 will move the sector 117 in a manner to move the arm 115 and therewith the clamp 113 from a position adjacent the apron 32 to receive the brush knot, to a position above the cup 112 to deposit the brush knot therein, the contour of the cam 119 being such as to cause the proper timing of the movement of the clamp 113 with respect to the operation of the other parts of the machine. Projecting from one of the arms 114 is an arm 120, between which and a lug on the arm 115 is interposed a spring 121 which is adapted to maintain the clamp 113 closed through the coacting gear wheels 122. When the clamp 113 is moved to a position adjacent the apron 32 to receive the brush knot the arm 120 engages an inclined projection 123 on the side frame 2, which forces the arm 120 toward the lug on the arm 115, in a manner to open the clamp 113 against the pressure of the spring 121, for the reception of the brush knot.

During the movement of the clamp 113 to its position adjacent the apron 32, it moves through the path traversed by said apron to the opposite side thereof, and the apron is then moved up to its position adjacent the clamp. After the brush knot has been assembled by the apron 32, the clamp starts to move toward the brush shaping cup 112. During the initial movement of the clamp, the arm 120 moves down the incline of the projection 123, and closes the clamp around the brush knot. Immediately upon the closing of the clamp, the apron 32 is opened upon the table 31 and is moved back beneath the hopper 4, thereby clearing the way for the clamp 113 with the inclosed brush knot, to move toward the cup 112, to deposit the brush knot therein. When the clamp occupies its position above the brush shaping cup 112, the brush knot therein is released from the clamp by an arm 124, which is operated to engage a projection 125 on one of the clamping members 113, and move said member away from the other member. The arm 124 forms one end of a lever 126 which is pivoted to a bracket 127 rising from the bed plate 1. The lever 126 is provided with a cam roller which bears against the cam 128 on the shaft 17, whereby, during the rotation of said shaft the lever is operated to open the clamp 113 to free the brush knot and deposit it within the cup 112, the contour of the cam 128 being such as to cause the proper timing of the operation of the arm 124 with respect to the movement of the clamp 113. As the clamp 113 moves from the position above the cup 112, the projection 125 escapes the arm 124.

By the hereinbefore described construction, it will be seen that the hoppers 4 and 5 form a source of supply for bristles of two different qualities, and that a predetermined quantity of bristles in a thin layer is taken from one source of supply and a predetermined quantity of bristles is taken from the other source of supply and deposited upon said layer, and thereafter the layer of bristles is assembled around the other bristles deposited thereon in a manner to form a brush knot, the inner bristles of which are of a different quality from those surrounding the same, and forming what is commonly known as "a cased brush knot".

While the machine forming the subject of my present invention may be used by itself, it may also be used in connection with a machine for shaping the brush knot and securing the bristles thereof together; such, for example, as that shown in my patent hereinbefore referred to, certain parts of which I have shown in the drawings for my present invention.

While I have herein shown and described a particular embodiment of my invention, I desire it to be understood that the machine and the operating parts thereof may be greatly modified without departing from the invention.

I claim:—

1. In a brush machine, the combination of two separate holders to contain bristles, bristle assembling mechanism and means for transferring bristles from said holders to said mechanism in alternate succession.

2. In a brush machine, the combination of a holder to contain bristles, means for taking a predetermined quantity of bristles from said holder, a second holder to contain bristles, means for taking a predetermined quantity of bristles from said second holder, and means for assembling the bristles taken from the first named holder around the bristles taken from the second named holder.

3. In a brush machine, the combination of a holder to contain bristles, means for taking a predetermined quantity of bristles from said holder and arranging them in a thin layer, a second holder to contain bristles, means for transferring a predetermined quantity of bristles from said second holder to said layer of bristles, and means for assembling said layer of bristles around the bristles taken from the second named holder.

4. In a brush machine, the combination of a holder to contain bristles, a transfer device to receive bristles from the holder, means for moving said device to a position beneath the holder, means for dividing the bristles within the holder a slight distance above said device to provide the device with a thin layer of bristles, means for moving the device away from the holder, a second holder to contain bristles, means for transferring a predetermined quantity of bristles from said second holder to said layer of bristles and means for assembling said layer of bristles around the bristles taken from the second named holder.

5. In a brush machine, the combination of a holder to contain bristles, a flexible member to receive bristles from the holder, means for introducing a thin layer of bristles from the holder to said member, a second holder to contain bristles, means for transferring a predetermined quantity of bristles from said second holder to said layer of bristles, and means for actuating the flexible member to assemble said layer of bristles around the bristles taken from the second named holder.

6. In a brush machine, the combination of a holder to contain bristles, a receptacle to receive bristles from the holder, means for transferring bristles from the holder to the receptacle, means for automatically stopping the transfer of bristles after a predetermined quantity thereof has been introduced to the receptacle, bristle assembling mechanism, and means for transferring the bristles from the receptacle to said mechanism.

7. In a brush machine, the combination of a holder to contain bristles, a weighing mechanism to receive bristles from the holder, means for transferring bristles from the holder to the weighing mechanism, bristle assembling mechanism, and means for transferring the bristles from the weighing mechanism to the assembling mechanism.

8. In a brush machine, the combination of a holder to contain bristles, a weighing mechanism to receive bristles from the holder, means for transferring bristles from the holder to the weighing mechanism, means under the control of the weighing mechanism for stopping the transfer of bristles, bristle assembling mechanism, and means for transferring bristles from the weighing mechanism to the assembling mechanism.

9. In a brush machine, the combination of a holder to contain bristles, a receptacle to receive bristles from the holder, means for transferring a predetermined quantity of bristles from the holder to the receptacle, a second holder to contain bristles, means for taking a predetermined quantity of bristles from said second holder and arranging them in a thin layer, means for transferring the bristles from the receptacle to said layer of bristles, and means for assembling the layer of bristles around the bristles delivered from the receptacle.

10. In a brush machine, the combination of a holder to contain bristles, a receptacle to receive bristles from the holder means for transferring bristles from the holder to the receptacle, means for automatically stopping the transfer of bristles after a predetermined quantity thereof has been introduced to the receptacle, a second holder to contain bristles, means for taking a predetermined quantity of bristles from second holder and arranging them in a thin layer, means for transferring the bristles from the receptacle to said layer of bristles, and means for assembling the layer of bristles around the bristles delivered from the receptacle.

11. In a brush machine, the combination of a holder to contain bristles, mechanism for assembling bristles into brush-knots, means for transferring bristles from the holder to said mechanism, mechanism for shaping the brush-knots and means for transferring the brush-knots from the assembling mechanism to the shaping mechanism.

12. In a brush machine, the combination of two separate holders to contain bristles, mechanism for assembling bristles into brush-knots, means for transferring bristles from said holders to said mechanism in alternate succession, mechanism for shaping the brush-knots, and means for transferring the brush-knots from the assembling mechanism to the shaping mechanism.

13. In a brush machine, the combination of a holder to contain bristles, means for taking a predetermined quantity of bristles from said holder, a second holder to contain bristles, means for taking a predetermined quantity of bristles from said second holder, means for assembling the bristles taken from the second named holder around the bristles taken from the first named holder to form brush-knots, mechanism for shaping the brush-knots, and means for transferring the brush-knots from the assembling means to the shaping mechanism.

14. In a brush machine, the combination of a holder to contain bristles, means for taking a predetermined quantity of bristles from said holder and arranging them in a thin layer, a second holder to contain bristles, means for transferring a predetermined quantity of bristles from said second holder to said layer of bristles, means for assembling said layer of bristles around the bristles taken from the second named holder to form brush-knots, mechanism for shaping the brush-knots, and means for transferring the brush-knots from the assembling means to the shaping mechanism.

In testimony whereof I affix my signature in presence of two witnesses.

JOSEPH F. MUMFORD.

Witnesses:
 JOSEPH F. MAGEE,
 JOHN F. HOY.